United States Patent [19]
Stopp et al.

[11] Patent Number: 6,022,065
[45] Date of Patent: Feb. 8, 2000

[54] VEHICLE WINDOW, ESPECIALLY FOR MOTORIZED VEHICLES, AND METHOD FOR MOUNTING SUCH A VEHICLE WINDOW

[75] Inventors: Walter Stopp, Deggingen; Gerhard Esser, Deizisau; Christian Rappl, Herrenberg; Erwin Butsch, Leutenbach, all of Germany

[73] Assignees: Reitter & Schefenacker GmbH & Co. KG, Germany; MC Micro Compact Car, Switzerland

[21] Appl. No.: 09/021,790

[22] Filed: Feb. 11, 1998

[30] Foreign Application Priority Data

Feb. 11, 1997 [DE] Germany ............... 197 05 132

[51] Int. Cl.[7] ............................................. B60J 1/00
[52] U.S. Cl. ................ 296/146.15; 296/201; 52/208
[58] Field of Search ............... 296/84.1, 96.21, 296/146.15, 201; 52/204.62, 204.64, 208

[56] References Cited

U.S. PATENT DOCUMENTS

| 4,874,201 | 10/1989 | Scaglietti | 296/201 |
| 5,062,248 | 11/1991 | Kunert | 296/201 |
| 5,584,526 | 12/1996 | Soldner | 296/146.15 |

FOREIGN PATENT DOCUMENTS

| 195416 | 11/1984 | Japan | 296/201 |
| 206717 | 10/1985 | Japan | 296/201 |

*Primary Examiner*—Dennis H. Pedder
*Attorney, Agent, or Firm*—Robert W. Becker & Associates

[57] ABSTRACT

A vehicle window has a window pane with a front side and a rear side. A frame is fixedly attached to the rear side of the window pane. The frame includes securing elements. A holder fastens the window pane in a mounting opening of a vehicle. The holder has counter securing elements cooperating with the securing elements of the frame. The holder has a central opening for accommodating the window pane. The counter securing elements point away from the central opening. The holder has a member shielding the counter securing elements from the central opening.

17 Claims, 8 Drawing Sheets

6,022,065

VEHICLE WINDOW, ESPECIALLY FOR MOTORIZED VEHICLES, AND METHOD FOR MOUNTING SUCH A VEHICLE WINDOW

BACKGROUND OF THE INVENTION

The present invention relates to a vehicle window, especially for motorized vehicles, comprising a window pane which along its edges is connected in a form-locking manner to a holder which engages with at least one counter securing element at least one securing element provided at the window pane and extends along the edge of the mounting opening of the vehicle. The invention also relates to a method for mounting such a vehicle window wherein the securing element and the counter securing element are secured by insertion into one another.

In such known vehicle windows the edge of the window pane is provided with an edge member in the form of a profiled clamping member having a clamping edge. The clamping edge comprises as a positive-locking element a groove that can be snapped into a circumferential fastening stay that projects from the holder. For securing the vehicle window at the car body, the vehicle window must be glued to the edge of the mounting opening. Due to the additional gluing step, the mounting of such a vehicle window is complicated and expensive.

It is also known to insert the window pane of a vehicle window into the circumferential groove of a two-part holder. The holder comprises a base body with a groove and a clamping edge that engages with a circumferential positive-locking member a corresponding groove of the other part of the holder. The groove is provided at the back side of the holder. Since the holder is comprised of two parts, mounting of the vehicle window requires two snap-on steps in order to mount the window pane with one holder part and to then combine the other part of the holder that is a clamping ledge. This vehicle window thus also requires a complicated and thus expensive assembly.

Also, vehicle windows are known in which the window pane is glued with an adhesive to the edge of the mounting opening.

It is therefore an object of the present invention to embody the aforementioned vehicle window and the aforementioned method such that the vehicle window can be mounted with only a few method steps in a simple, fast and inexpensive manner.

SUMMARY OF THE INVENTION

The vehicle window according to the present invention is primarily characterized by:
- a window pane having a front side and a rear side;
- a frame fixedly attached to the rear side of the window pane;
- the frame comprising at least one securing element;
- a holder fastening the window pane in a mounting opening of a vehicle;
- the holder having at least one counter securing element cooperating with the at least one securing element;
- the holder having a central opening for accommodating the window pane;
- the at least on counter securing element pointing away from the central opening;
- the holder having a member shielding the at least one counter securing element from the central opening.

The holder rests preferably on an inner edge of the frame.

The frame and the window pane preferably consist of plastic material.

The frame and the window pane are preferably injection-molded to one another.

The window pane consists of a thermoplastic, transparent and clear plastic material.

The frame preferably consists of a colored thermoplastic plastic material.

Advantageously, the holder has a cutout and at least one closure element inserted into the cutout to close the holder.

The closure element is preferably a snap-on member.

The holder advantageously has a plurality of counter securing elements distributed in a circumferential direction of the holder.

The at least one counter securing element is a tab.

The at least one counter securing element extends parallel to the window pane.

Advantageously, the frame has a plurality of securing elements distributed in a circumferential direction of the frame.

Preferably, the at least one securing element is a bracket projecting in a direction away from the rear side of the window pane.

Preferably, the holder engages an edge of the mounting opening.

The frame is positioned on one side of the edge of the mounting opening and the holder is positioned on the other side of the edge of the mounting opening.

Advantageously, the frame of the window pane and the holder rest under tension at the edge of the mounting opening.

Expediently, the at least one securing element is located at the edge of the mounting opening.

The method of the present invention is primarily characterized by the following steps:
- Providing a window pane having a frame with at least one securing element fixedly attached to the rear side of the window pane;
- Positioning the window pane at one side of the edge of a mounting opening of the vehicle;
- Providing a holder having at least one counter securing element cooperating with the at least one securing element and having a central opening for accommodating the window pane, wherein the at least one counter securing element points away from the central opening and wherein the holder has a member shielding the at least one counter securing element from the central opening;
- Positioning the holder on the other side of the edge of the mounting opening opposite the window pane;
- Inserting the at least one counter securing element of the holder into the at least one securing element of the frame by elastically deforming the holder to fasten the window pane and the holder under tension in the mounting opening.

Preferably, the method further includes the steps of:
- Providing the holder with a cutout and at least one closure element inserted into the cutout to close the holder;
- Opening the holder by removing the closure element before the step of positioning the holder;
- Placing the closure element into the cutout after the step of inserting.

The inventive vehicle window requires for mounting at the vehicle only the securing element provided at the frame of the window pane and the counter securing element provided at the holder which are to be connected in a single method step. The holder has a member that covers the counter securing element so that it can not be seen from the mounting opening. In addition to the insertion step no other method steps are required. Especially, it is not necessary to employ an adhesive for securing the window pane at the edge of the mounting opening.

According to the inventive method, the window pane and the holder are positioned on opposite sides of the mounting opening at its edge. Subsequently, the securing element of the frame and the counter securing element of the holder are connected to one another by simple insertion. The edge of the mounting opening is then positioned in the area between the window pane and the holder so that the window pane, respectively, the vehicle window is securely held in its mounted position. Due to the positive-locking connection the additional use of an adhesive is not required.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–8.

The vehicle window for a motor vehicle in the disclosed embodiment is a side window of a motor vehicle. The window has a circumferential holder 1 to which is connected a window pane 2. The holder 1 is comprised of plastic material. The window pane consists of a thermoplastic, especially clear (transparent) plastic material, for example, PMMA or PC. To the exterior side of the window pane a scratch-resistant coating can be applied, for example, a silicone lacquer.

Figure 1:
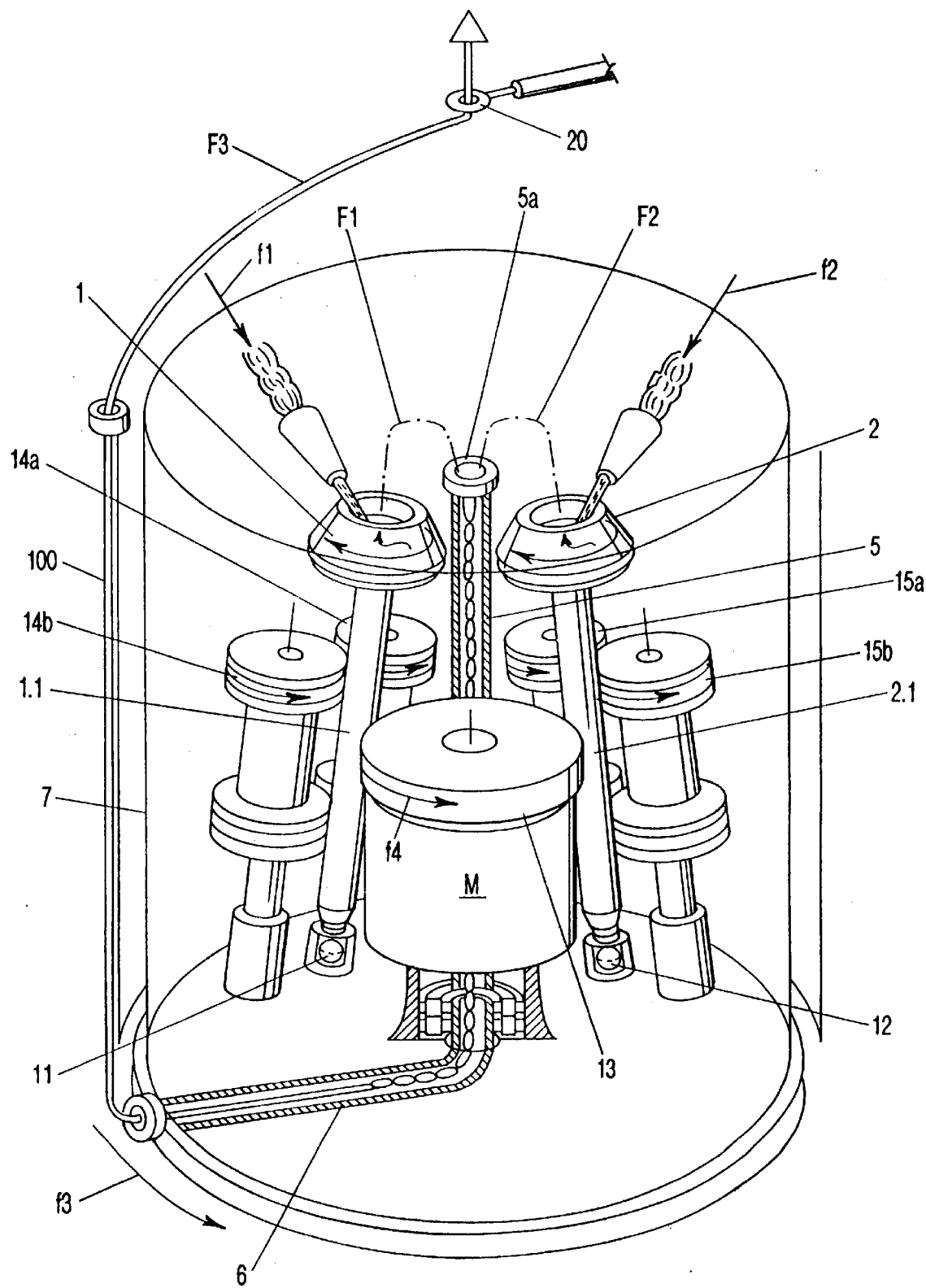
FIG. 1 is a view from the outside onto the inventive vehicle window.
Figure 2:
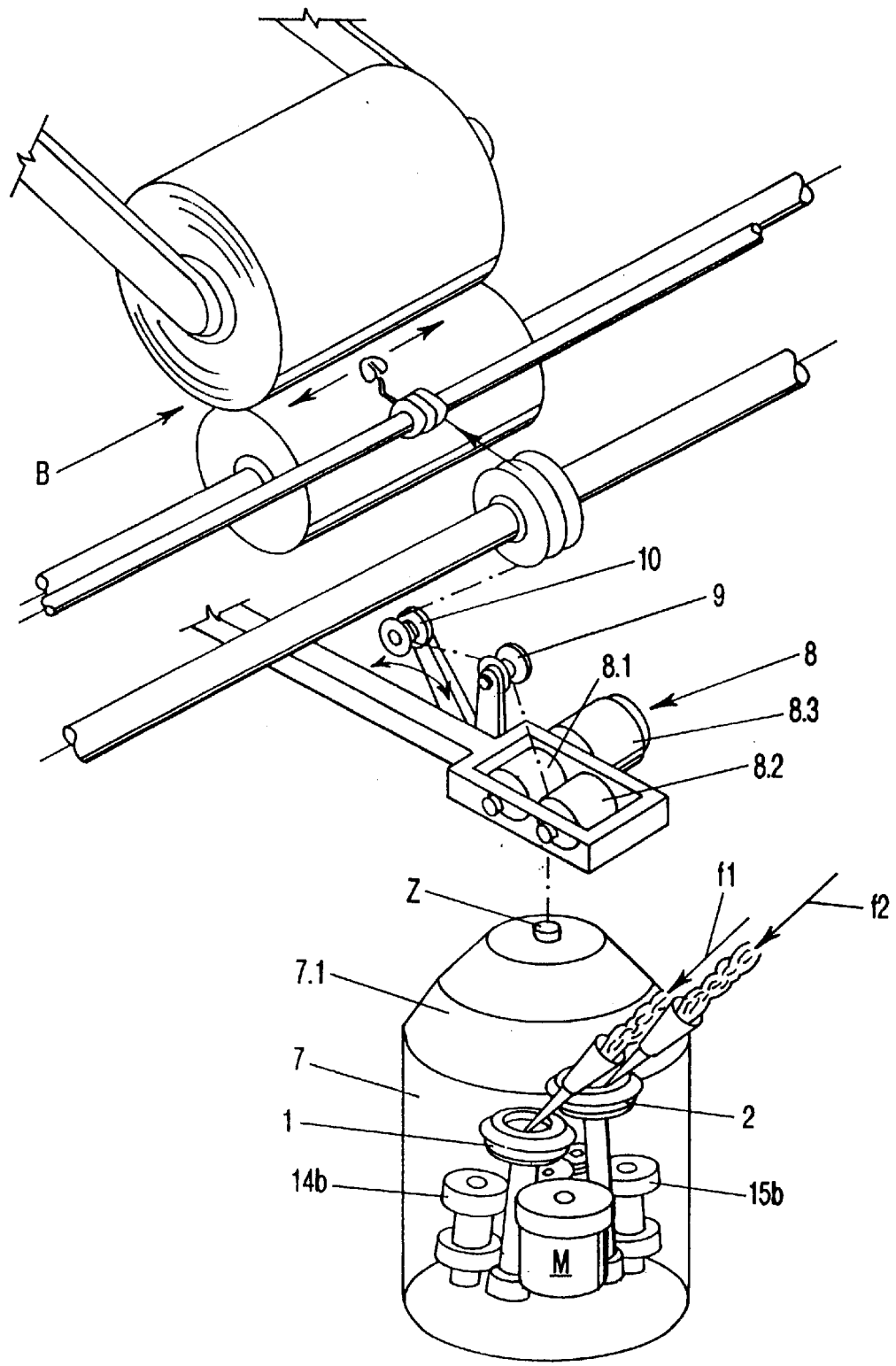
FIG. 2 is a view from the inside onto the vehicle window according to FIG. 1.
Figure 7:
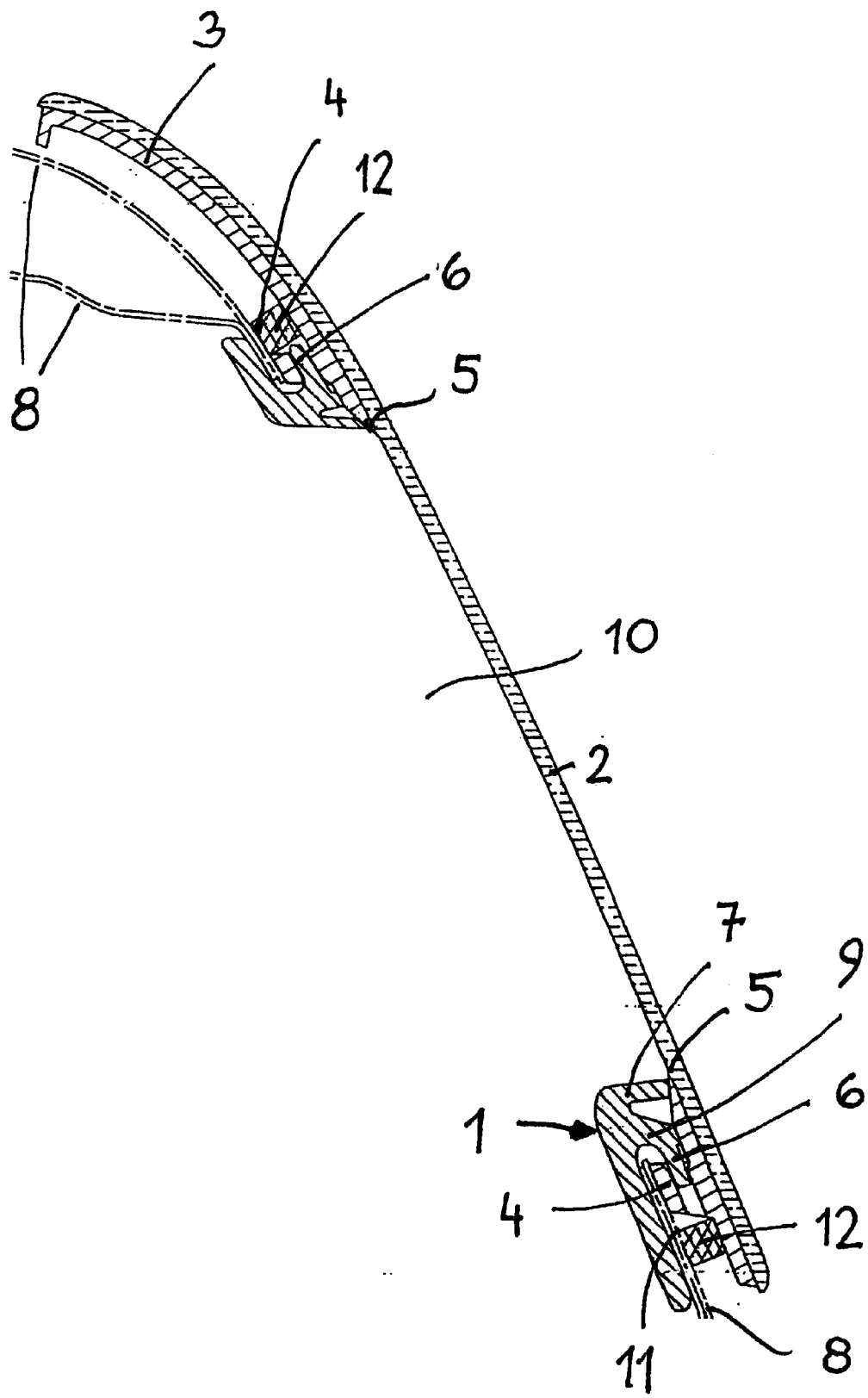
FIG. 7 is a section along the line XII—XII of FIG. 5 of the holder connected to the window pane.
Figure 8:
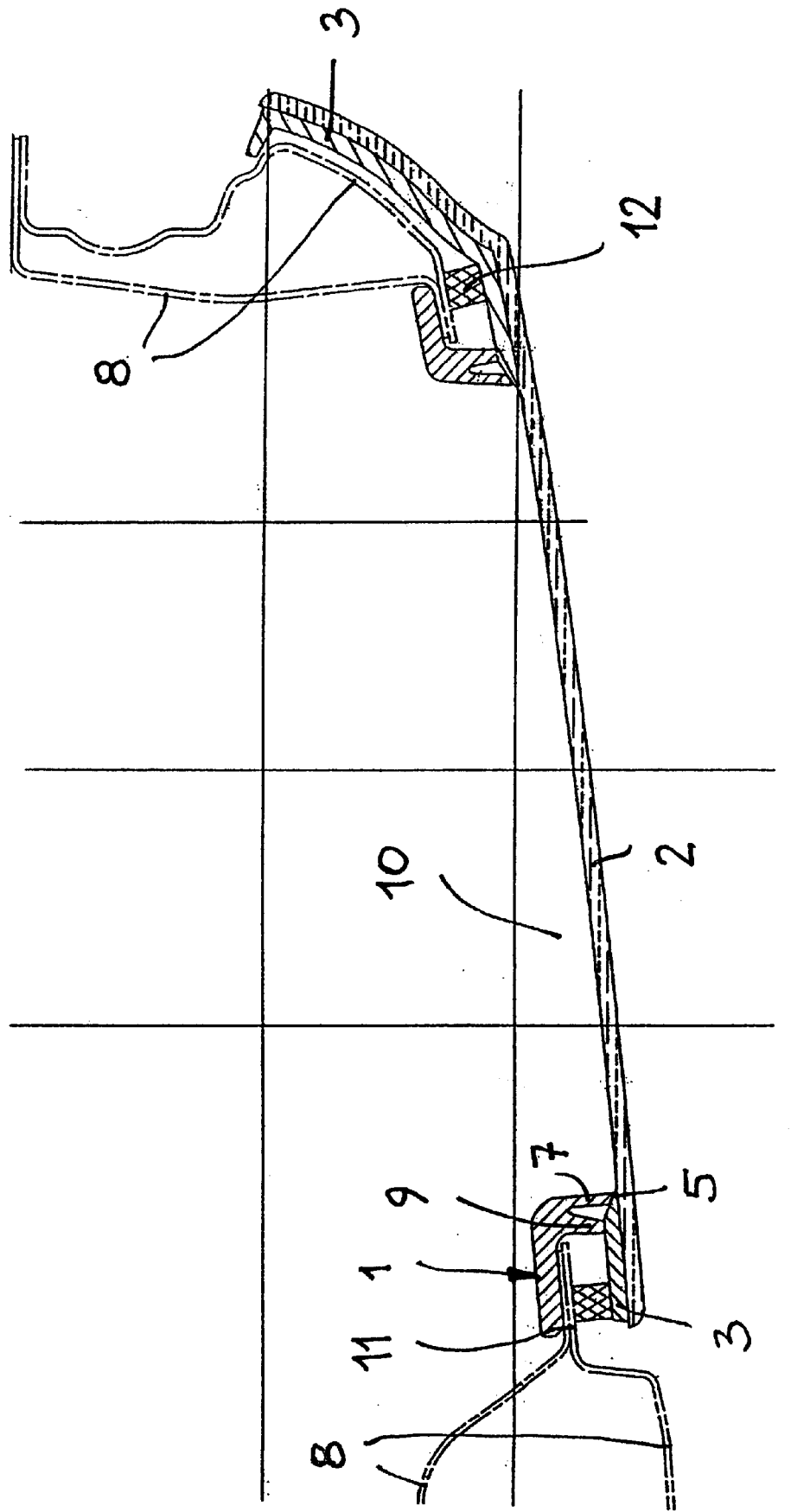
FIG. 8 shows a section along the line XIII—XIII of FIG. 5 of the holder connected to the window pane.
Figure 1:
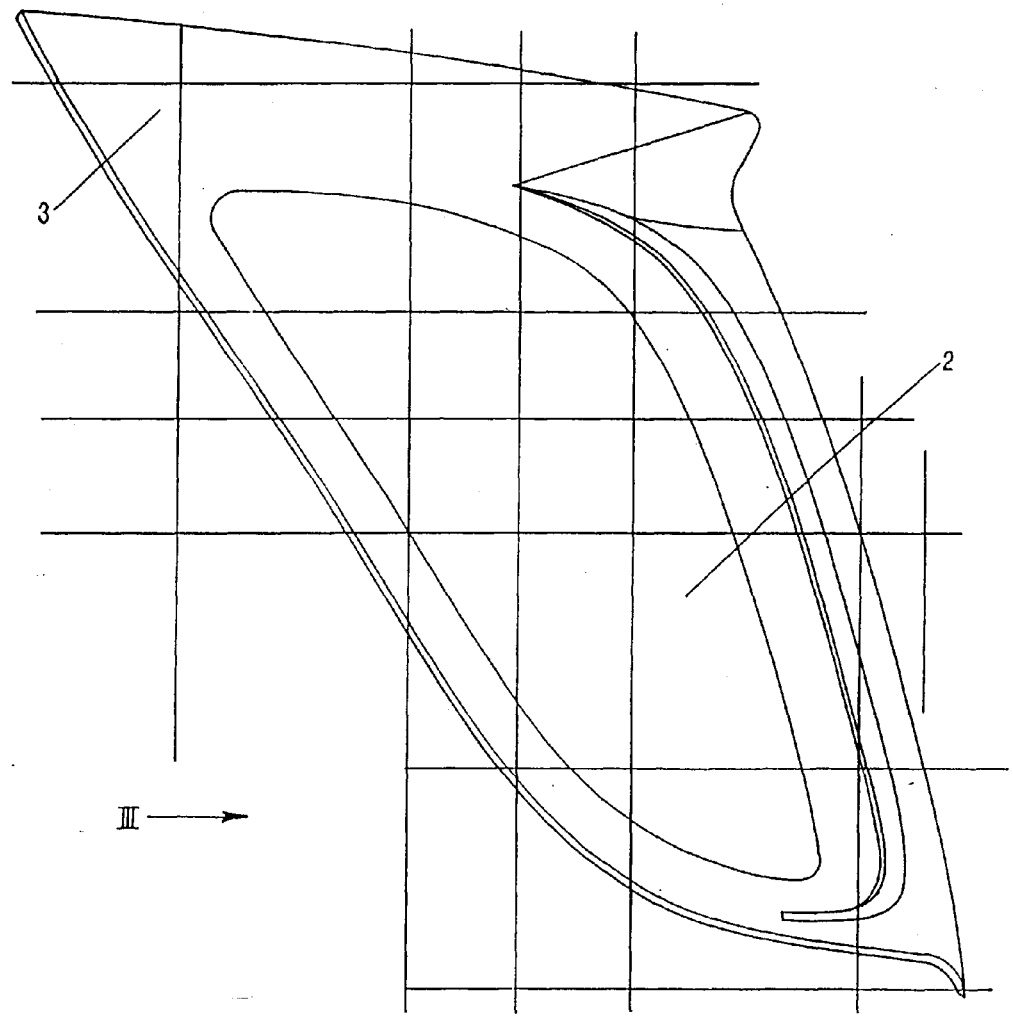
Figure 2:
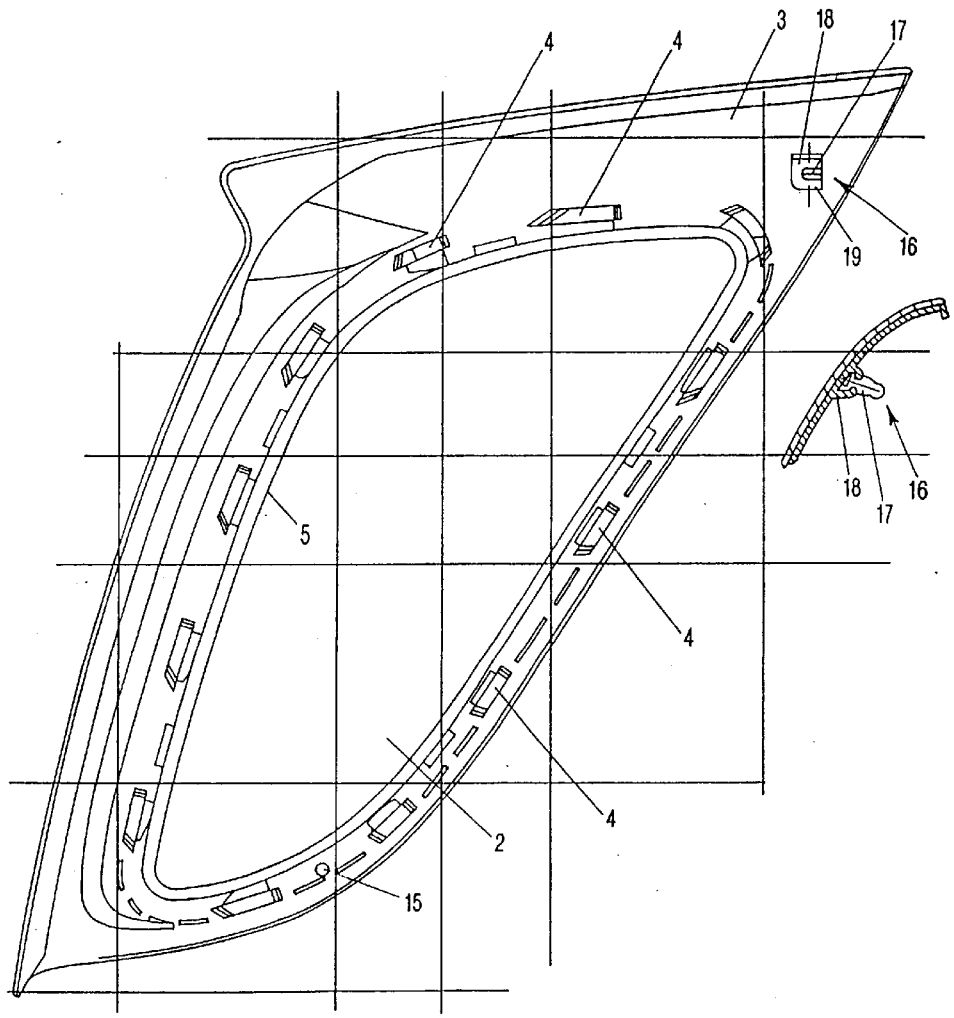

As shown in FIGS. 7 and 8, the inner (rear) side of the window pane is provided with a circumferential frame 3 that is advantageously comprised of a colored plastic material, for example, ABS or a mixture of ABS and PC. The connection between the window pane and the frame 3 can be achieved by surficial melting and fusing of the two parts during an injection molding process. The frame 3 is for example, black and, as shown in FIGS. 1 and 2, has a different width over its circumference. Depending on the design of the vehicle window, the frame 3, of course, can have a constant width over its circumference. The window pane 2 and the frame 3 fixedly connected thereto form a constructive unit that is to be positive-lockingly connected to the holder 1 in a manner to be disclosed in the following.

Figure 3:
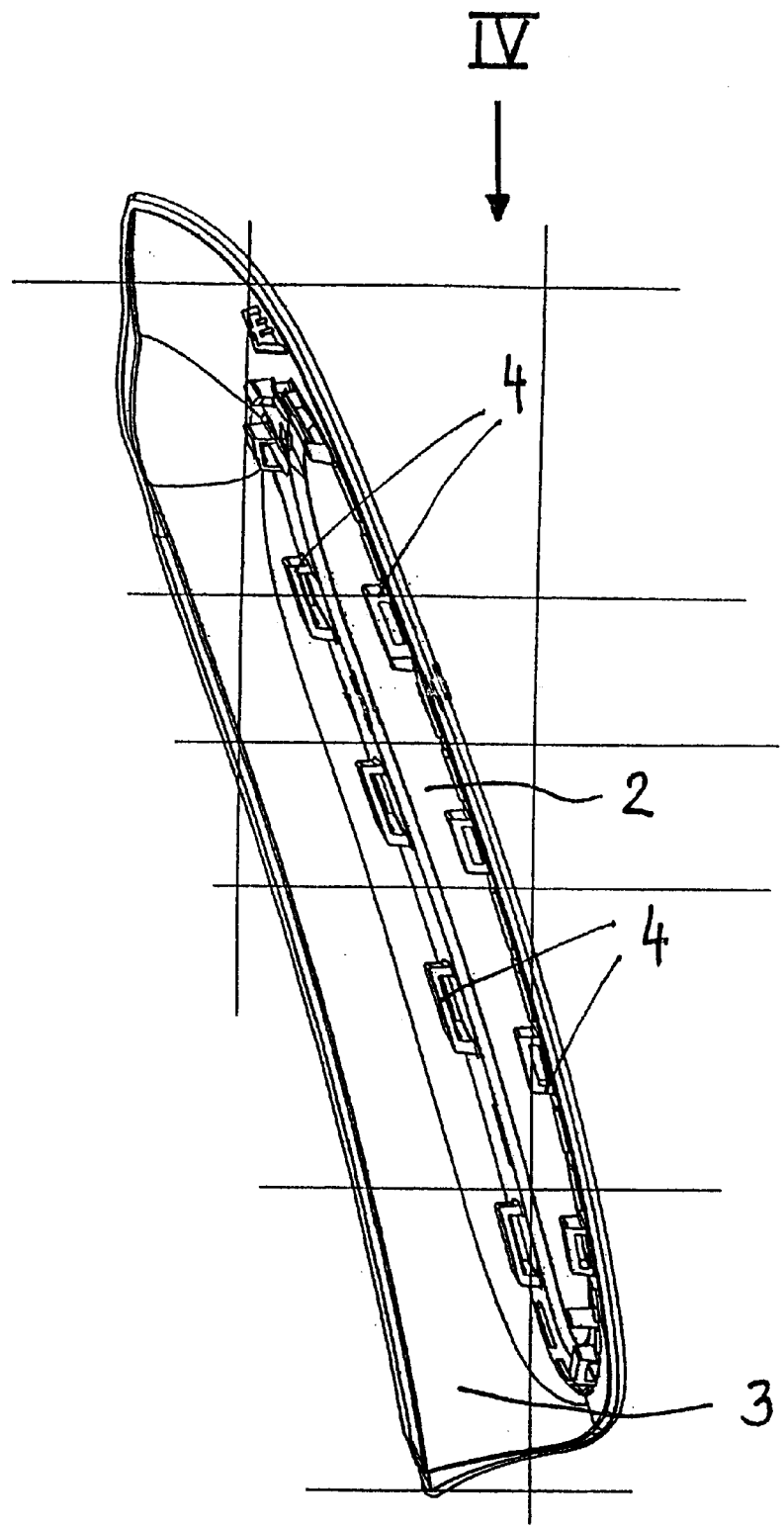
FIG. 3 is a view in the direction of arrow III of FIG. 1.
Figure 4:
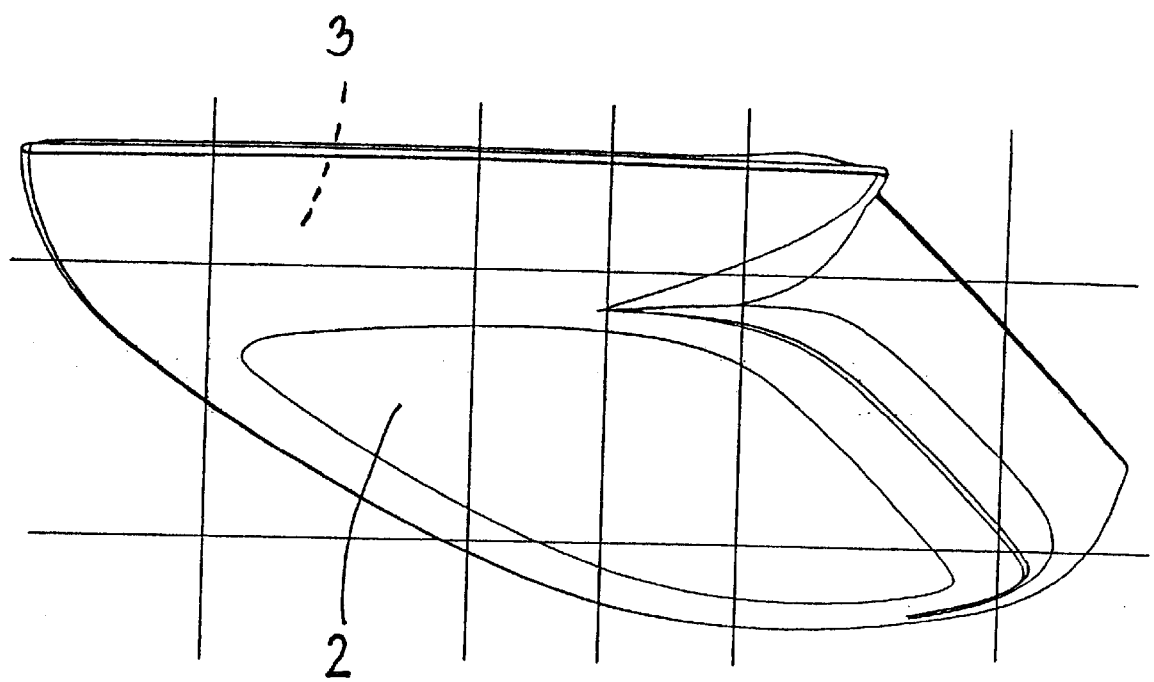
FIG. 4 is a view in the direction of arrow IV of FIG. 3.
Figure 5:
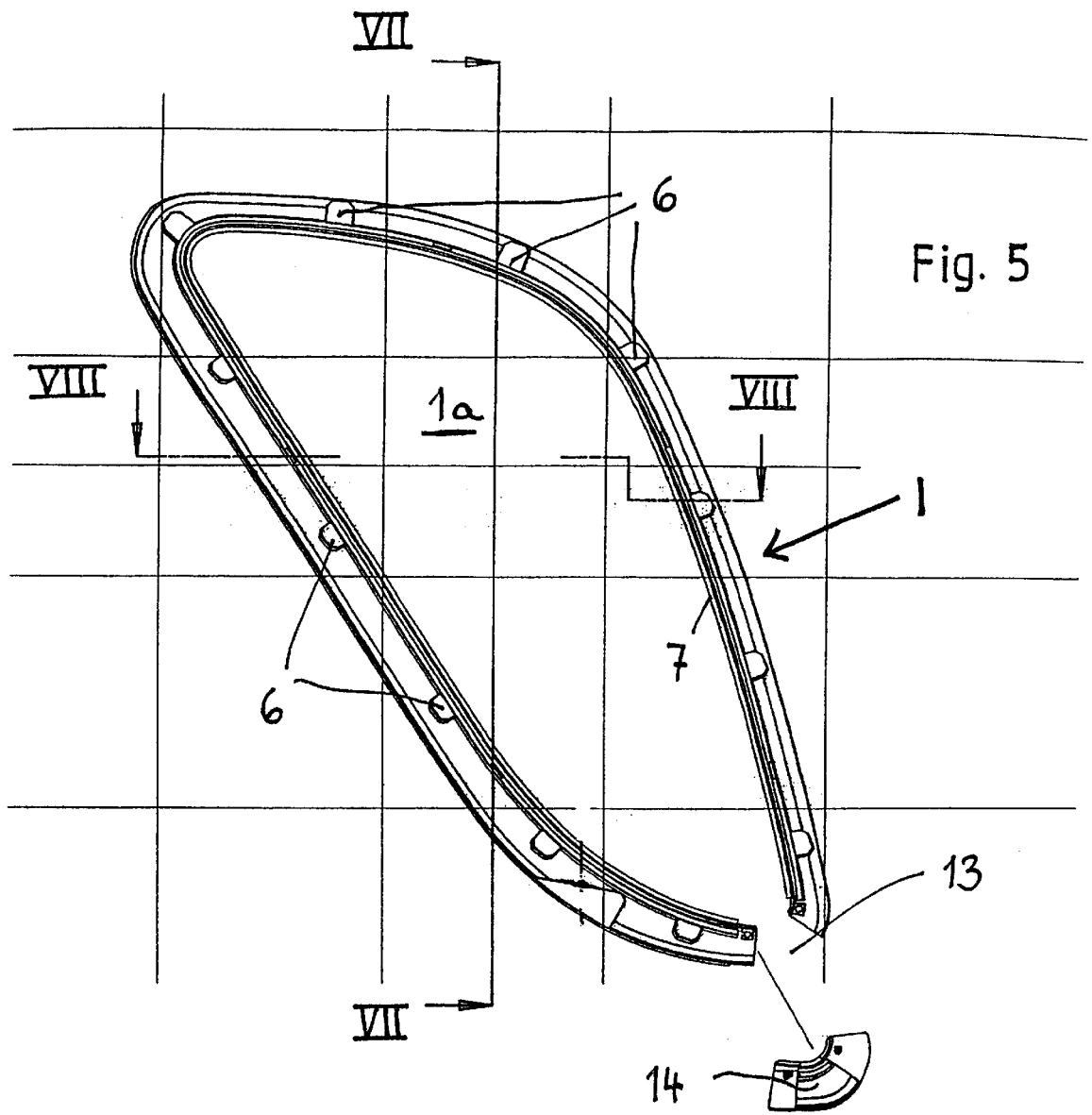
FIG. 5 is a holder of the inventive vehicle window in a view from the vehicle interior.

The frame 3 comprises positive-locking securing elements 4 distributed about its circumference which, in the shown embodiment, are embodied as brackets projecting from the side of the frame 3 facing away from the window pane. They are located in the vicinity of the inner edge 5. As can be seen in FIGS. 2 and 3, the bracket-shaped positive-locking securing elements 4 extend substantially parallel to the neighboring part of the inner edge 5 of the frame 3. The positive-locking securing elements 4 thus are open in the direction toward the window opening surrounded by the frame 3. The positive-locking securing elements 4 cooperate during mounting of the vehicle window with counter securing elements 6 provided at the holder 1 (FIG. 5). These counter securing elements 6 are embodied as tabs which can be inserted into the bracket openings of the positive-locking securing elements 4 of the frame 3. As shown in FIG. 5, the counter securing elements 6 are also distributed about the circumference of the holder 1. Advantageously, each one of the securing elements 4 has coordinated therewith a counter securing element 6 so that a secure fastening of the vehicle window is ensured.

The holder 1, as shown in FIGS. 7 and 8, has a circumferential edge or member 7 facing the frame 3, respectively, the window pane 2 and extending transverse to the frame 3 or the window pane 2. In the mounted position of the vehicle window it rests on the frame 3 along the inner edge 5. The edge 7 thus delimits together with the frame 3 the window opening for the window pane 2. The edge 7 is a shielding member that shields the counter securing elements 6 in the direction of the central opening 1a of the holder 1 so that when the vehicle window is mounted these counter securing elements 6 are not visible.

The tab-shaped counter securing elements 6 are provided at the inner side of the holder 1 facing the frame 3 and engage the positive-locking securing elements 4 of the frame 3 (FIG. 7). The thickness of the counter securing elements 6 corresponds advantageously to the height of the bracket opening of the securing elements 4 so that the holder 1 and the window pane 2 with its frame 3 are connected without play and are securely and tightly held at the sheet metal 8 of the car body. Directly adjacent to the edge 7 the holder 1 has a further edge 9 which extends transversely to the holder 1. The holder 1 in the mounted position rests with the edge 9 at a distance from the inner edge 5 on the frame 3 of the window pane 2 (FIG. 8). The two edges 7, 9 are positioned, when viewed in cross-section, in a V-shape to one another. In the area of the counter securing elements 6 (FIG. 7) the inner edge 9 is bent outwardly such that the tab-shaped counter securing elements 6 are formed.

The thickness of the frame 3 continuously increases from the inner edge 5 toward the level of the securing elements 4. The edge 7 (shielding member) of the holder 1 rests at the inner edge 5 of the frame 3 of the window pane 2 while the edge 9 rests on the area of the frame 3 which has a constant or uniform thickness. As an alternative to the represented embodiment, the frame 3 can, of course, also have the same thickness at the inner edge 5 as in the other parts of the frame.

Figure 6:
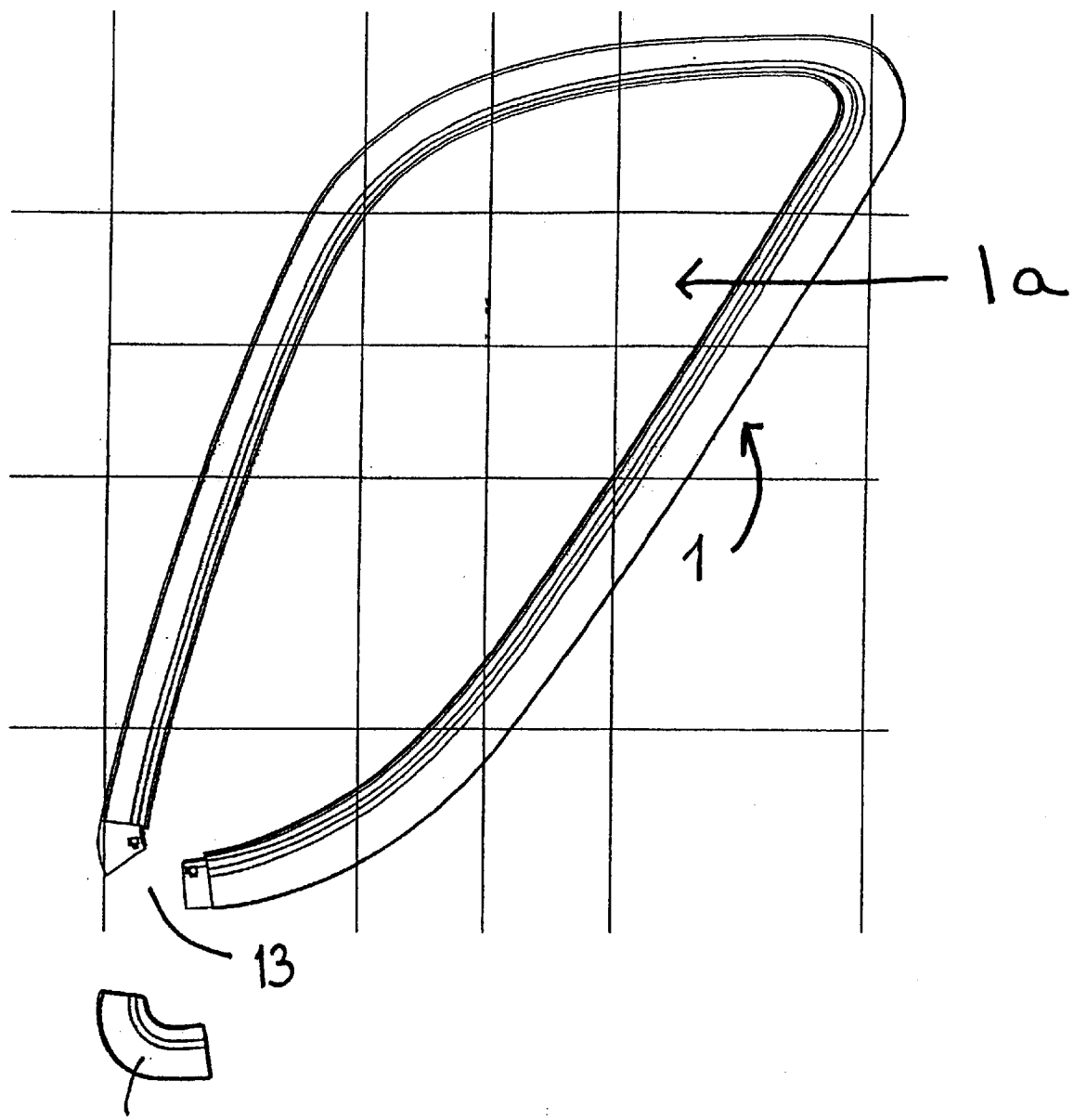
FIG. 6 shows the holder according to FIG. 5 in a view from the vehicle exterior.

The car body sheet metal 8 of the vehicle has a mounting opening 10 (FIGS. 7 and 8) for the vehicle window. The mounting opening 10 is delimited by the edge 11 formed by the sheet metal 8. The window pane 2 with frame 3 is placed against the exterior vehicle side of the sheet metal edge 11 with interposition of a circumferential seal 12 (FIGS. 7 and 8). Subsequently, from the interior of the vehicle the tab-shaped counter securing elements 6 of the holder 1 are inserted into the bracket-shaped securing elements 4 of the frame 3. In order to make such an insertion possible, the holder 1 is open, as shown in FIGS. 5 and 6. Since the holder 1 is also elastically deformable, the tab-shaped counter securing elements 6 can be inserted one after another into the corresponding positive-locking securing elements 4 of the frame 3. The holder 1 is elastically embodied so that this threading or insertion step can be easily performed. On the other hand, the holder 1 has a sufficient stability in a direction transverse to its plane, such that the vehicle window in the mounted position is securely and reliably held at the sheet metal 8 of the car body. During the insertion process the holder 1 is bent inwardly to such an extent that the respective securing element 6 can be easily inserted from the area of the mounting opening 10 into the positive-locking securing element 4 of the frame 3.

The holder 1 and/or the window pane 2 with frame 3 are embodied such that in the mounted position they rest under elastic deformation of the seal 12 securely at the edge 11 of the sheet metal 8 of the car body. After the threading or insertion step, the opening or cutout 13 (FIGS. 5 and 6) provided within the holder 1 is closed by the closure element 14 that completes the open holder 1 to a closed frame structure. The closure element 14 is advantageously a snap-on member that can be easily snapped into place to close the holder 1. The embodiment as a snap-on element has the advantage that for exchanging the window pane the holder 1 can be easily removed.

In order to allow for a precise positional arrangement of the window pane relative to the mounting opening 10 within the car body, the frame 3 of the window pane 2 is provided with a centering element 15 (FIG. 2) that is advantageously embodied as a pin and engages a matching centering opening at the edge 11 of the car body sheet metal 8.

Furthermore, the frame 3 is provided with at least one safety element 16 (FIG. 2) that secures the elastic window part additionally at the car body and prevents it from protruding therefrom. This safety element 16 has a transversely projecting snap-on member 17 that is snapped into a non-represented opening within the sheet metal 8 of the car body. The snap-on member 17 is positive-lockingly secured in a holding member 18 that has an insertion opening 19 via which the snap-on member 17 is inserted into the securing member 18. The snap-on member 17 has a widened end portion with which it engages behind the edge of the insertion opening 19.

The vehicle window in the shown embodiment is a side window of a vehicle. However, the vehicle window of the present invention can also be the rear window or the windshield of a vehicle. According to the disclosed embodiment, the vehicle window can easily be mounted at the vehicle and can also be demounted, if necessary. The inventive vehicle window is especially advantageous because it can be quickly mounted since the holder 1 can be easily and effortlessly mounted in the afordescribed manner together with the window pane 2 at the car body. Further mounting s teps in addition to the threading step are not required. The window pane 2 with the frame 3 can be injection-molded in a single mold so that the vehicle window can be inexpensively manufactured.

The specification incorporates by reference the disclosure of German priority document 197 05 132.4 of Feb. 11, 1997.

The present invention is, of course, in no way restricted to the specific disclosure of the specification and drawings, but also encompasses any modifications within the scope of the appended claims.

What is claimed is:
1. A vehicle window comprising:
   a window pane having a front side and a rear side;
   a frame fixedly attached to said rear side of said window pane;
   said frame comprising securing elements;
   a holder fastening said window pane in a mounting opening of a vehicle;
   said holder having monolithic counter securing elements cooperating with said securing elements;
   said holder having a central opening for accommodating said window pane;
   said holder surrounding the mounting opening;
   said counter securing elements extending from said central opening outwardly toward an outer edge of said holder;
   said holder having a member shielding said counter securing elements from said central opening.
2. A vehicle window according to claim 1, wherein said holder rests on an inner edge of said frame.
3. A vehicle window according to claim 1, wherein said frame and said window pane consists of plastic material.
4. A vehicle window according to claim 1, wherein said frame and said window pane are injection-molded to one another.
5. A vehicle window according to claim 1, wherein said window pane consists of a thermoplastic, transparent, and clear plastic material.
6. A vehicle window according to claim 1, wherein said frame consists of a colored thermoplastic plastic material.
7. A vehicle window according to claim 1, wherein said holder has a cutout and at least one closure element inserted into said cutout to close said holder.
8. A vehicle window according to claim 7, wherein said closure element is a snap-on member.
9. A vehicle window according to claim 1, wherein said counter securing elements are distributed in a circumferential direction of said holder.
10. A vehicle window according to claim 1, wherein said counter securing elements are tabs.
11. A vehicle window according to claim 1, wherein said counter securing elements extend essentially parallel to said window pane.
12. A vehicle window according to claim 1, wherein said securing elements are distributed in a circumferential direction of said frame.
13. A vehicle window according to claim 1, wherein said securing elements are brackets attached to a side of said frame facing away from said window pane and projecting in a direction toward said holder.
14. A vehicle window according to claim 1, wherein said holder engages an edge of the mounting opening.
15. A vehicle window according to claim 1, wherein said frame is positioned on one side of the edge of the mounting opening while said holder is positioned on the other side of the edge of the mounting opening.
16. A vehicle window according to claim 1, wherein said securing elements and said counter securing elements are connected without play so that said frame of said window pane and said holder rest securely and tightly at the edge of the mounting opening.
17. A vehicle window according to claim 16, wherein said securing elements are located at the edge of the mounting opening.

* * * * *

UNITED STATES PATENT AND TRADEMARK OFFICE
CERTIFICATE OF CORRECTION

PATENT NO.    : 6,022,065
DATED         : February 8, 2000
INVENTOR(S)   : Stopp et al.

It is certified that error appears in the above-identified patent and that said Letters Patent is hereby corrected as shown below:

The drawing sheets consisting of figures 1&2 should be deleted, to be replaced with the drawing sheets consisting of figures 1&2, as shown on the attached sheets.

Signed and Sealed this

Third Day of June, 2003

JAMES E. ROGAN
*Director of the United States Patent and Trademark Office*